United States Patent [19]

Hertz

[11] Patent Number: 4,518,403
[45] Date of Patent: May 21, 1985

[54] DEGASSER-DESURGER UNIT

[75] Inventor: Darryl W. Hertz, Casper, Wyo.

[73] Assignee: Standard Oil Company, Chicago, Ill.

[21] Appl. No.: 546,605

[22] Filed: Oct. 28, 1983

[51] Int. Cl.³ .............................................. F01D 19/00
[52] U.S. Cl. ...................................... 55/194; 55/199; 210/151; 210/180
[58] Field of Search ......... 55/41, 43, 52, 90, 171–175, 55/183, 178, 192, 194, 199, 233, 32, DIG. 5; 210/151, 615, 616, 188, 617, 150, 539; 261/DIG. 72; 239/565, 556, 557

[56] References Cited

U.S. PATENT DOCUMENTS

| | | | |
|---|---|---|---|
| 1,749,385 | 3/1930 | Kolts et al. | 239/556 |
| 2,522,005 | 9/1950 | Whitlock et al. | 55/41 |
| 2,788,080 | 4/1957 | Guarin | 55/183 |
| 3,119,674 | 1/1964 | Glasgow et al. | 55/32 |
| 3,273,318 | 9/1966 | Meyer | 55/175 |
| 3,335,549 | 8/1967 | Hendrix | 55/178 |
| 3,377,778 | 4/1968 | Garrtner | 55/52 |
| 3,419,251 | 12/1968 | Eckert | 239/556 |
| 3,739,551 | 6/1973 | Eckert | 55/90 |
| 3,955,932 | 5/1976 | Meyer | 55/233 |
| 4,035,302 | 7/1977 | Seo et al. | 210/304 |

Primary Examiner—Charles Hart
Attorney, Agent, or Firm—Scott H. Brown; Fred E. Hook

[57] ABSTRACT

The present invention provides a method and related apparatus for desurging and degassing a liquid stream having hydrocarbon, aqueous and gaseous components, such as from at least one production well. Within the method, the liquid stream is introduced into a vessel or degasser unit through a sparger device which is disposed therein, to distribute the flow of the liquid stream into the vessel, as well as to partially degas the liquid. Upon exiting the sparger device, the liquid passes downward through a body of packing elements within the vessel to further degas the liquid and also to desurge the flow of the liquid stream. Thereafter, any separated gas is removed from an upper portion of the vessel and the degassed liquid is removed through a lower portion of the vessel. The degassed liquid can then be passed to an oil-water separator, such as a vortex separation tank.

5 Claims, 4 Drawing Figures

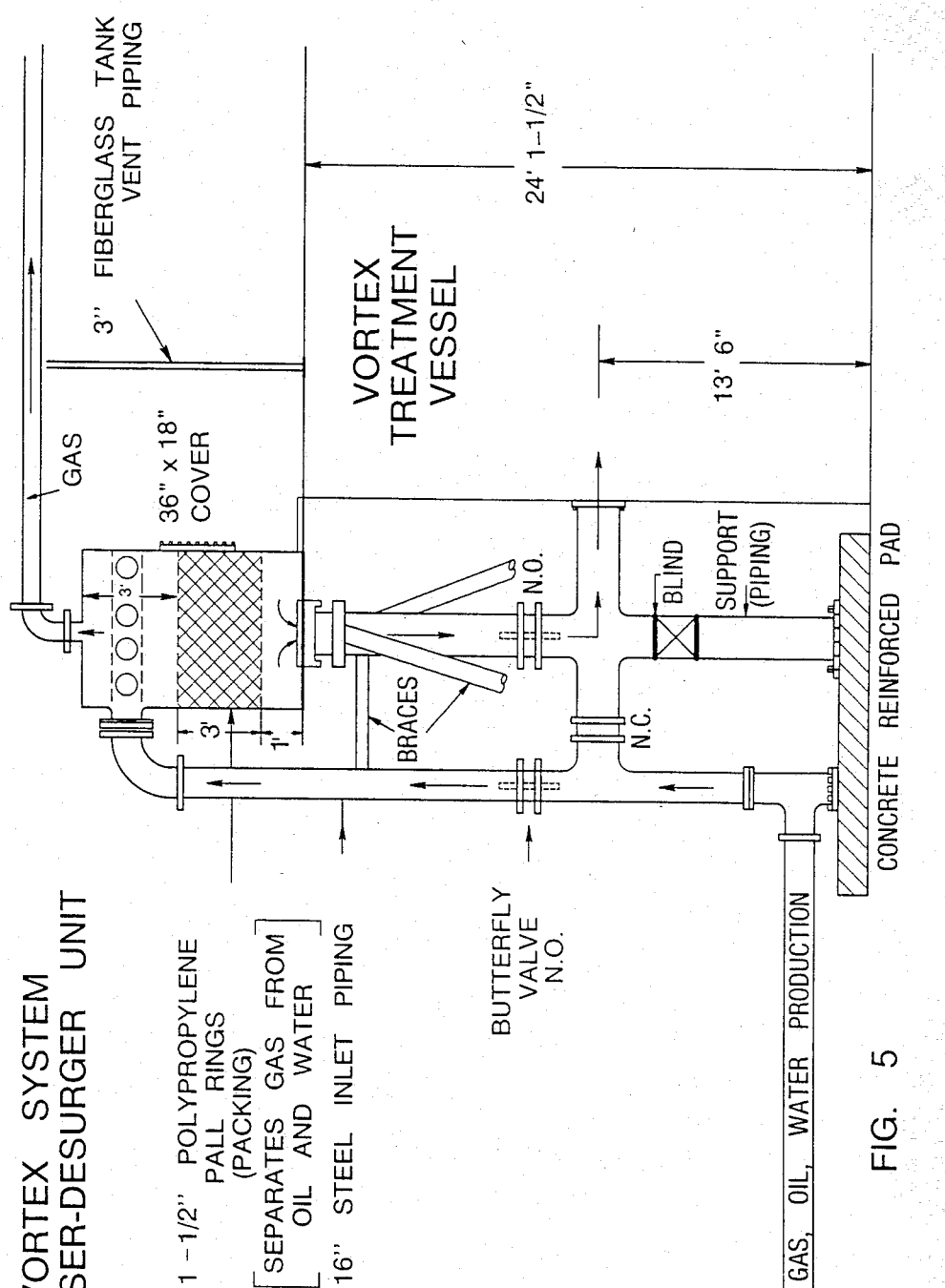

DEGASSER-DESURGER UNIT

BACKGROUND OF THE INVENTION

1. Field of the Invention

The present invention relates to a unit to separate gas from a liquid stream and, more particularly, to such a unit for separating gas from an oil and water production stream, as well as desurging the flow of such production stream.

2. Setting of the Invention

In the production of oil from subterranean reservoirs, the production stream, can contain, in addition to oil, water and entrained gas, such as methane, butane and the like. Before the oil can be transported or introduced into a pipeline, the water and the gas need to be removed. Oil-water separators and degassers are well known; however, in certain situations these oil-water separators and degassers do not perform adequately. Further, the oil-water separators and degassers are usually equipped with mechanical flow control devices, such as float level controllers and dump valves, which require periodic maintenance and tend to be expensive.

One such special situation where conventional oil-water separators and degassers are inadequate is when these devices are used in conjunction with a vortex separation tank. A vortex separation tank is a large hollow tank into which is tangentially introduced the production stream. The oil and water separate by their density differences as the oil slowly spirals around the internal walls of the tank. It has been found that when an oil-water production stream is introduced into such a vortex separation tank, any entrained gas will bubble through the oil and water which agitates the fluid thus reducing the overall separation effectiveness of the separation process. Also, when the production stream is introduced into the vortex separation tank the gas begins to separate and form large bubbles within the production stream piping which then enhance or cause fluid surges, which drastically reduce the separation effectiveness of the separation process in a vortex separator tank. Flume-type and conventional degassers have been tried with vortex separation tanks to prevent such surges; however, these degassers are expensive, have mechanical control devices which require maintenance, and do not effectively prevent or eliminate production stream surges caused by pulses in flow rates. There exists a need for a simple, essentially maintenance free device to degas an oil and water production stream and to also desurge the flow of the production stream.

SUMMARY OF THE INVENTION

The present invention is a method and related apparatus for desurging and degassing a production stream, where the production stream has hydrocarbon, aqueous, and gaseous components, and which is contemplated to overcome the foregoing disadvantages. In the method, the production stream is introduced into a tank or degasser unit through a sparger device to distribute the flow of the liquid into the degasser unit and to partially separate the gaseous components from the liquid, which will hereafter be referred to as "degassing" the liquid. The degassed liquid is then passed through a body of packing elements to further degas the liquid and also to desurge the flow of the liquid, that is, to eliminate variances in flow rates of the production stream exiting the degasser unit. Any separated gas is removed from an upper portion of the degasser unit while the degassed liquid is removed from a lower portion of the degasser unit. One embodiment of the present invention is utilized to desurge and degas a production stream from at least one production well and the degassed liquid therefrom is passed to an oil-water separator, such as a vortex separation tank.

BRIEF DESCRIPTION OF THE DRAWINGS

FIG. 5 is a side elevational view of another embodiment of the present invention.

DETAILED DESCRIPTION OF THE PREFERRED EMBODIMENTS

The present invention provides a method and related apparatus for desurging and degassing a production stream which has hydrocarbon, aqueous, and gaseous components. The production stream is introduced into the degasser unit through a liquid inlet and then through a sparger device to distribute the flow of liquids evenly throughout an upper portion of the degasser unit, as well as to partially degas the liquid. The degassed liquid passes through a body of packing elements, retained within the degasser unit below the sparger device, to desurge the flow of the liquid and to further degas the liquid. Any separated gas exits from the degasser unit through a gas outlet located adjacent an upper portion of the degasser unit and the degassed liquid is removed through a liquid outlet located adjacent a lower portion of the degasser unit. The degassed liquid can be then introduced into a fluid separator device, such as an oil-water separator or a vortex separator tank.

It should be understood that the present invention can be utilized in many different operations where a production stream is to be degassed, such as in chemical refining, manufacturing processing and the like; however, for the purpose of the present discussion, it will be assumed that the production stream is from at least one production well and the degassed liquid is introduced into an oil-water separator device, as is well known in the art. Preferably, the degassed fluid exiting from the degasser unit is passed into a vortex separator tank, as is disclosed within U.S. patent application Ser. No. 399,639, filed July 19, 1982, and assigned to Standard Oil Company, a corporation of Indiana.

Figure 1:
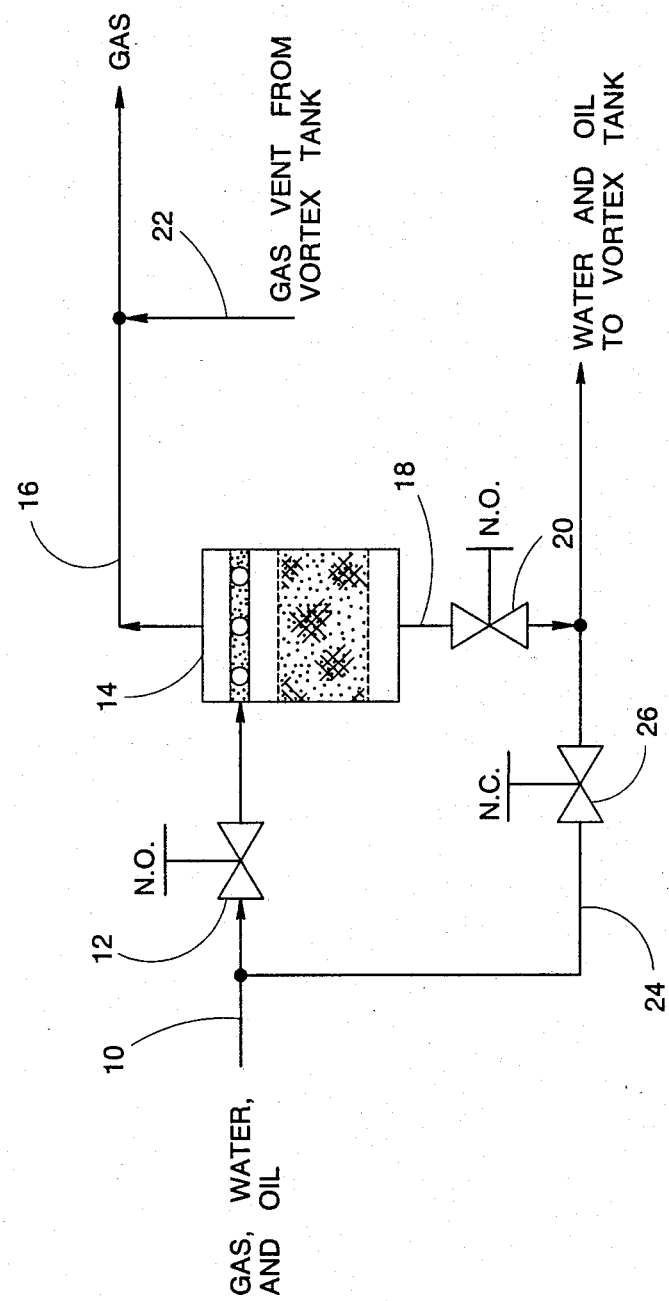
FIG. 1 is a diagrammatic representation of a degasser and desurger unit of the present invention.

For better understanding of the present invention, reference is made to the accompanying drawings. In FIG. 1, a production stream having several components, such as gas, water, and oil from at least one production well, is passed via gravity feed or pumping through a conduit 10 and a normally open valve 12, such as a butterfly valve, to an enclosed vessel, tank, or degasser unit 14. A more detailed description of the operation and construction of the degasser unit 14 will be provided below. A conduit 16 extends out from an upper portion of the degasser unit 14 and is utilized for removal of any separated gas from the degasser unit 14. A conduit 18 extends out from a lower portion of the degasser unit 14 and is utilized to remove the degassed liquid from a lower portion of the degasser unit 14 through a normally open valve 20.

A conduit 22 is connected into the conduit 16 and is used to remove any additional separated oil-water separator device (not shown). A bypass conduit 24 is connected into the conduit 10 upstream from the valve 12 and into the conduit 18 downstream of the valve 20. The conduit 24 is provided with a normally closed valve 26 so that when the degasser unit 14 is to be serviced, the valves 12 and 20 are closed and the valve 26 is opened so that the production stream introduced into the conduit 10 will flow directly into the oil-water separator device.

Figure 2:
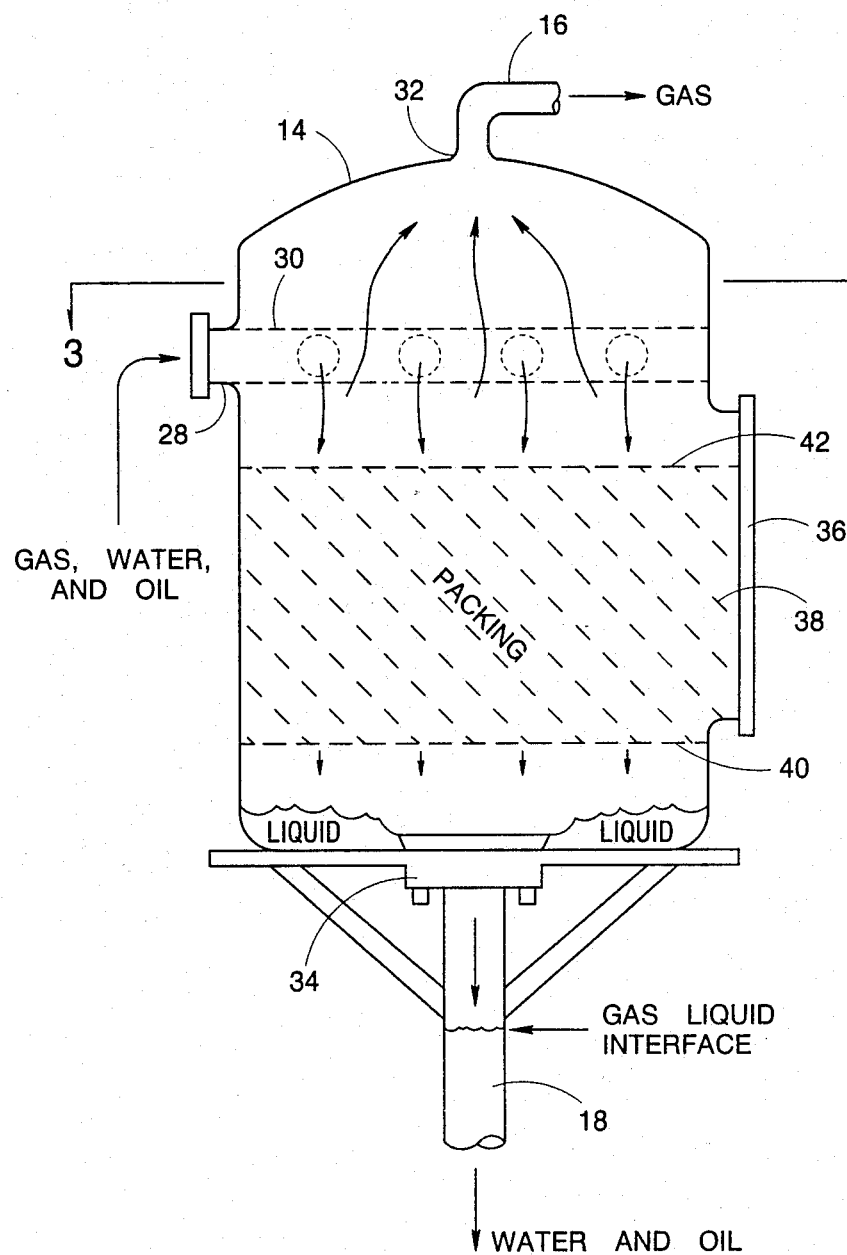
FIG. 2 is a cross sectional view of one embodiment of the degasser and desurger unit of the present invention.

The degasser unit 14 can be formed in any shape, such as cylindrical, spherical, or rectangular, but, as shown in FIG. 2, it is preferably an enclosed circular vessel. The degasser unit 14 is provided with a conventional flanged inlet connection 28 for interconnection with the conduit 10, as is well known in the art. Disposed within the degasser unit 14, adjacent an upper portion thereof, and connected to the connection 28 is a sparger device 30 which is used to partially degas the production stream, as well as to evenly direct the flow of liquids into the degasser unit 14 (as will be described in more detail below). The degasser unit 14 is provided with a gas outlet connection 32 adjacent an upper portion of the degasser unit 14 for interconnection with the conduit 16, as is well known in the art. A lower portion of the degasser unit 14 is provided with a flanged fluid outlet connection 34 for interconnection with the outlet conduit 18, as is well known in the art. The degasser unit 14 is preferably provided with an access hatch 36 in the wall of the degasser unit 14 for servicing of and removal of a retained mass or body of packing elements, generally indicated by reference No. 38. The packing elements 38 are supported above the bottom of the degasser unit 14 by a bottom screen or perforated tray 40 and are retained beneath the sparger device 30 by a similar upper screen or tray 42. The trays 40 and 42 are connected to the internal walls of the degasser unit 14 as desired. Preferably that tray 42 is removably connected to the internal wall of the degasser unit 14.

Figure 3:
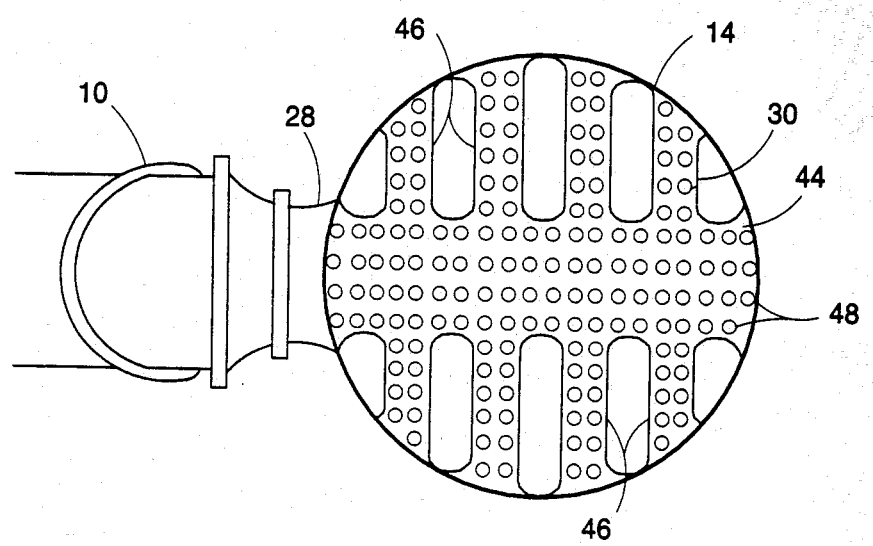
FIG. 3 is a view taken along line 3—3 of FIG. 2.

The sparger device 30, as shown in FIG. 3, is generally comprised of a central longitudinal pipe or conduit 44 of any configuration, but is preferably an oblong shaped cylindrical enclosed conduit, through which the liquid is passed. Extending out from the conduit 44 and connected to the degasser unit's 14 walls are a plurality of horizontally disposed cross pipes 46, the interiors of which are in communication with the interior of the conduit 44. The cross pipes 46 can be of any configuration; however, it is preferred that the cross pipes 46 be of round configuration. Both the conduit 44 and use of the cross pipes 46 are provided with a plurality of openings or holes 48 in lower portions thereof for discharge and even distribution of the introduced production stream and also to aid in the separation of gas from production stream introduced into the degasser unit 14. The holes 48 can be of any configuration, however, it is preferred that the holes 48 be of a round configuration and spaced only on the bottom surfaces of the conduits 44 and 46. Most preferably, the total cross sectional area of all of the holes 48 is at least equal to the internal cross sectional area of the fluid inlet conduit 10, to provide even flow of liquids and a minimization of back pressure.

Figure 4:
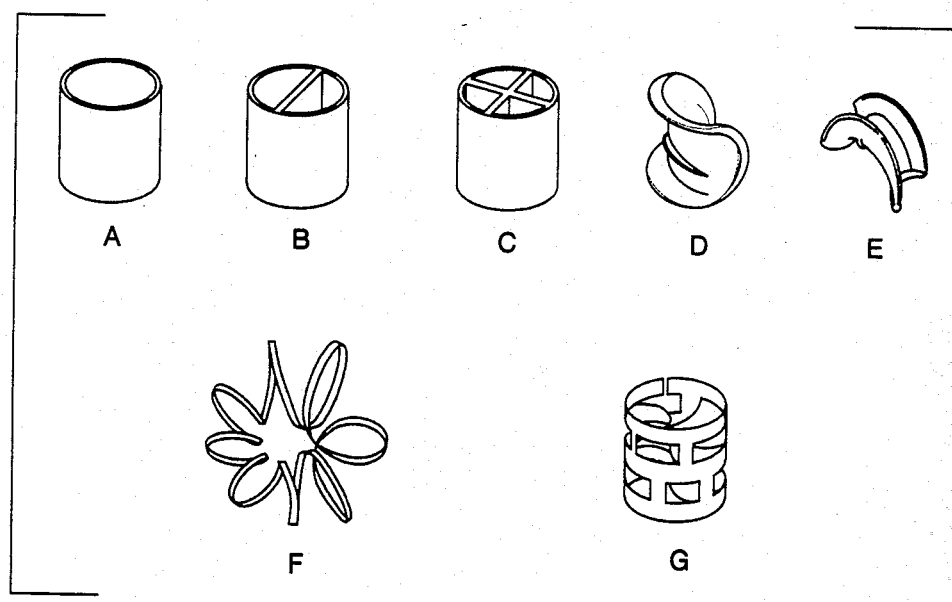
FIG. 4 is an illustration of various packing elements that may be utilized in the present invention.

The individual packing elements 38 are designed to have a large surface area to aid in degassing and desurging the flow of the production stream but not so small as to create excessive pressure drop through the packing section. Suitable packing elements 38 of the type used in packed tower absorbers, strippers, and reactors are shown in FIG. 4, such as: (a) rasching rings, (b) lessing rings, (c) partition rings, (d) berl saddles, (e) intalox saddles, (f) tellerettes, and (g) pall rings. These elements can be formed of any suitable materials, such as ceramic, stainless steels, porcelain, or many types of plastics. It has been found that the pall rings (G) provide very satisfactory degassing and desurging results and preferably, the pall rings are about 1½ in. in diameter and are formed from polypropylene.

In the operation of the present invention, a production stream from at least one production well is pumped or introduced into the conduit 10. Due to pump strokes, surface piping configurations, and the like, the flow of the production stream into the conduit 10 is usually in surges. The production stream then passes through the valve 12 and into fluid inlet 28 and into the sparger device 30. The production stream exits through the holes 48 and flows downward upon and through the packing elements 38. Upon exiting the holes 48, most of the gas within the production stream immediately changes direction, because of its low density, and flows upwards to the gas outlet 32. As partially degassed liquid contacts the packing elements 38, any remaining gas is separated because of the large surface area of the packing elements enables the trapped gas to be freed. Gas flows out of the outlet pipe 16, which is of a diameter that is dependent upon the design flow rate of the gas stream, while the degassed liquid continues to pass downward through the packing elements 38. The degassed liquid then collects in a lower portion of the degasser unit 14 and is then passed out through the fluid outlet 34 and through the valve 20, to be introduced into a vortex tank separator or another oil-water-type separator device.

It should be noted that the packing elements 38 allow the liquid and gas to approach normal equilibrium at a much faster rate than in conventional degasser devices because of the extremely large surface area of the packing elements 38. Also, the packing elements 38 allow the liquid to pass across and through the upward flowing gas which allows the gas composition to approach equilibrium faster. The desurging action is provided by the sparger device 30 and the packing elements 38 and occurs because the liquid is allowed to fall through the upward flowing gas phase and the large surface areas of the packing elements 38 thus dampening the inlet liquid surges that can occur.

In designing the apparatus of the present invention, design considerations include the inlet liquid rate which determines the inlet piping diameter, liquid sparger device diameter, the number of holes in the sparger device, as well as the diameter of the degasser unit itself. The outlet liquid rate determines the outlet pipe diameter, the height of the degassser unit above the ground and the highest liquid level in the degasser unit. The inlet gas rate also determines the diameter of the degasser unit. The outlet gas rate determines the diameter of the gas pipe, friction pressure drop through the outlet gas piping system, working pressure of the degasser unit, as well as the wall thickness of the degasser unit. The inlet liquid temperature and composition determines the type of material used for the degasser unit 14.

In designing the size of the degasser unit 14, one will perform certain pressure drop calculations to determine the minimum vessel diameter. It will be assumed that for all applications, the depth of the packing elements 38 will be three (3) feet and the diameter of the degasser unit 14 will be varied to accommodate the projected gas flow rates. For example, when using three (3) feet of 1½ in. polypropylene pall rings, a design liquid flow rate of 120,000 barrels per day (1,743,731 lb/hr) and a design gas flow rate of 200 MCF/day (483.3 lb/hr), how large (in diameter feet) should the degasser unit 14 be? Using the Leva equation:

$$\frac{\Delta P}{h} = \frac{(.1925)\gamma 10^{\frac{OL}{\rho L}} G^2}{\rho G}$$

where
- ($\alpha P/h$) = pressure drop per foot of packing (inches $H_2O$/ft)
- $\gamma$ = packing constant ($5.78 \times 10^{-8}$)
- O = secondary packing constant (0.004)
- L = superficial liquid mass vel. (lb/hr ft$^2$)
- G = superficial gas mass vel. (lb/hr ft$^2$)
- $\rho_L$ = density of liquid (lb/ft$^3$)
- $\rho_G$ = density of gas (lb/ft$^3$)

and using $\rho_G$ = 0.058 lb/ft$^3$ and $\rho_L$ = 62.11 lb/ft$^3$ for a typical fluid from the Salt Creek Field in Wyoming, the following calculations can be made:

| Sample Tank Diameter (ft) | Planar Surface Area (ft$^2$) of packing | L | G | $\Delta P/h$ |
|---|---|---|---|---|
|   | ($\pi(4)2/4$) = | 1,743,731/12.57 = | 483.3/12.57 = |   |
| 4 | 12.57 | 138,722 | 38.45 | 243,601 |
| 5 | 19.64 | 88,785 | 24.61 | 140.8 |
| 6 | 28.3 | 61,616 | 17.08 | 0.52 |
| 7 | 38.5 | 45,292 | 12.55 | 0.025 |

In designing the degasser unit 14 for diameter, the $\Delta P/h$ is preferably no more than about 0.50; thus, a six foot diameter degasser unit 14 is chosen for the following equation. Also, these calculations do not take into account the additional gas separation that occurs through the sparger device 30 and the effect of when the liquid enters the top of the packed section.

The maximum gas flow rate for the above designed tank diameter can be calculated using the following equation:

$$\frac{(2.5 \text{ in } H_2O/\text{ft})\rho_G^{\frac{1}{2}}}{(.1925)\gamma 10^{\frac{OL}{e_L}}} = G(\text{lb/hr ft}^2)$$

Using the above example, the maximum gas flow rate for the six foot degasser unit 14 is:

$$\frac{(2.5)(.058)^{\frac{1}{2}}}{(.1925)(5.78 \times 10^{-8}) 10^{\frac{(.004)(61,616)}{62.11}}} = 37.4 \text{ lb/hr ft}^2 \text{ or 439 MCF per day}$$

Different sized units of the present invention have been built and utilized with successful results in the Amoco Production Company operated Salt Creek Light Oil Unit Oil Field in Wyoming. Table 1 lists six degasser units utilized at the Amoco operated field, as well as the specified design liquid flow rates, the design maximum gas flow rates, the current liquid flow rates, and the current gas flow rates.

A typical degasser unit 14 built in accordance with the present invention is shown in FIG. 5 and uses conduits 10, 24, and 18 formed from 16 in. steel pipes which pass through butterfly valves and into the degasser unit 14. The degasser unit 14 can be constructed from steel or aluminum, but preferably is constructed from fiberglass for lightness and low maintenance. The conduit 44 in the sparger device 30 is approximately 12 in. high in O.D. and the cross pipes 46 are about 8 in. in O.D. The gas outlet 16 is approximately 6-8 in. steel piping conduit and the sparger device 30 is spaced no less than about 12 in. beneath the gas outlet 32 and about 6-10 in. above the top screen 42. Both the top screen 42 and the bottom screen 40 are made of 8 or 14 gauge expanded metal packing trays with polyurethane coating. The access hatch 13 is a two piece extended typical clean out or hatch which is approximately 36 in. by 18 in. The packing elements 38 are spaced above the liquid outlet 34 by no less than about 12 in. to prevent liquid from coming into contact with the packing elements 38.

Whereas the present invention is described in particular relation to the drawings attached hereto, it should be understood that other and further modifications, apart from those shown or suggested herein, may be made within the scope and spirit of this invention.

TABLE I
SALT CREEK LIGHT OIL UNIT
DEGASSER - DESURGER DESIGN INFORMATION

| LACT 1 | 1 unit, 6' diameter | | |
|---|---|---|---|
| | Design Liquid Flow Rate = | 50,000 | BFPD |
| | *Design Maximum Gas Flow Rate = | 6,300 | MCFD |
| | Current Liquid Flow Rate = | 43,000 | BFPD |
| LACT 4 | 2 units, 10' diameter | | |
| | Design Liquid Flow Rate = | 200,000 | BFPD each |
| | *Design Maximum Gas Flow Rate = | 2,000 | MCFD each |
| | Current Liquid Flow Rate = | 75,000 | BFPD |
| LACT 5 | 2 units, 6' diameter | | |
| | Design Liquid Flow Rate = | 120,000 | BFPD each |
| | *Design Maximum Gas Flow Rate = | 440 | MCFD each |
| | Current Liquid Flow Rate = | 120,000 | BFPD |
| LACT 10 | 2 units, 6' diameter | | |
| | Design Liquid Flow Rate = | 120,000 | BFPD each |
| | *Design Maximum Gas Flow Rate = | 440 | MCFD each |
| | Current Liquid Flow Rate = | Unknown | |
| LACT 11 | 1 unit, 7' diameter | | |
| | Design Liquid Flow Rate = | 75,000 | BFPD |
| | *Design Maximum Gas Flow Rate = | 1,500 | MCFD |
| | Current Liquid Flow Rate = | Unknown | |
| LACT 13 | 1 unit, 6' diameter | | |
| | Design Liquid Flow Rate = | 55,000 | BFPD |
| | *Design Maximum Gas Flow Rate = | 5,200 | MCFD |
| | Current Liquid Flow Rate = | 55,000 | BFPD |

*NOTE:
This value does not include the degasser units' capacity to separate gas as the fluid enters the top of the packed section 38. This additional capacity has not been tested but is expected to be quite large.

I claim:

1. A system for degassing and desurging a liquid stream, the liquid stream including water, gaseous components, and liquid hydrocarbon components, comprising:
   - a first conduit in communication at one end with a source of the liquid stream;
   - an enclosed vessel having a liquid inlet adjacent an upper portion thereof and in communication with a second end of the first conduit;

means for degassing and desurging the liquid stream consisting of a sparger device disposed within an upper portion of the enclosed vessel and in communication with the liquid inlet, the sparger device comprising a horizontal central conduit and a plurality of horizontal cross pipes connected to the central conduit, the central conduit and the cross pipes including a plurality of openings therein; and a body of packing elements retained within the enclosed vessel below the sparger device;

a second conduit connected at one end to a liquid outlet in the enclosed vessel below the bottom of the body of packing elements for removing the degassed and desurged water and liquid hydrocarbon components; and a third conduit connected to an opening in an upper portion of the enclosed vessel above the sparger device for removing separated gaseous components.

2. The system of claim 1 wherein a second end of the second conduit is in communication with a vortex separator tank.

3. The system of claim 1 wherein the first and second conduits are provided with valves.

4. The system of claim 3 wherein a fourth conduit connects the interior of the first conduit with the interior of the second conduit, the fourth conduit including a valve.

5. The system of claim 2 wherein the enclosed vessel is retained adjacent an upper portion of the vortex separator tank, and includes vertical supports.

* * * * *